(12) United States Patent
Pomykaj

(10) Patent No.: US 10,621,047 B2
(45) Date of Patent: Apr. 14, 2020

(54) VOLUME GROUP STRUCTURE RECOVERY IN A VIRTUALIZED SERVER RECOVERY ENVIRONMENT

(71) Applicant: International Business Machines Corporation, Armonk, NY (US)

(72) Inventor: Andrzej Pomykaj, Wroclaw (PL)

(73) Assignee: International Business Machines Corporation, Armonk, NY (US)

( * ) Notice: Subject to any disclaimer, the term of this patent is extended or adjusted under 35 U.S.C. 154(b) by 295 days.

(21) Appl. No.: 15/480,428

(22) Filed: Apr. 6, 2017

(65) Prior Publication Data

US 2018/0293136 A1 Oct. 11, 2018

(51) Int. Cl.
*G06F 7/00* (2006.01)
*G06F 17/30* (2006.01)
*G06F 11/14* (2006.01)

(52) U.S. Cl.
CPC ...... *G06F 11/1464* (2013.01); *G06F 11/1469* (2013.01); *G06F 2201/815* (2013.01); *G06F 2201/84* (2013.01)

(58) Field of Classification Search
CPC ............. G06F 11/1464; G06F 11/1469; G06F 2201/84; G06F 2201/815
USPC .................................. 707/653, 654, 999.102
See application file for complete search history.

(56) References Cited

U.S. PATENT DOCUMENTS

| | | | |
|---|---|---|---|
| 8,713,356 B1 | 4/2014 | Chan et al. | |
| 9,026,751 B2 | 5/2015 | Irisawa et al. | |
| 2007/0174354 A1* | 7/2007 | Kodama | ............. G06F 11/1469 |
| 2017/0033937 A1* | 2/2017 | Yazdha | ................. H04W 12/08 |

FOREIGN PATENT DOCUMENTS

CN          104615508          5/2015

\* cited by examiner

*Primary Examiner* — Md I Uddin
(74) *Attorney, Agent, or Firm* — Schmeiser, Olsen & Watts, LLP; Mark Vallone

(57) ABSTRACT

A method and system for automatically performing a volume group structure recovery in a virtualized server recovery environment. A first portion of a first physical volume is accessed and then stored in a temporary file. A last valid volume group backup for a volume group is retrieved. The volume group is a logical group of physical volumes that include the first physical volume. The volume group backup includes respective volume group identifiers corresponding to the physical volumes of the volume group. An existing volume group identifier is replaced with a generated random volume group identifier. Volume group identifiers in the last valid volume group backup is replaced with new volume group identifiers that were generated during a re-initializing of all physical volumes in a list of the physical volumes of the logical group. The volume group's volume group structure is restored using a backup structure stored in the temporary file.

20 Claims, 6 Drawing Sheets

VOLUME GROUP STRUCTURE RECOVERY IN A VIRTUALIZED SERVER RECOVERY ENVIRONMENT

TECHNICAL FIELD

The invention relates generally to a method for performing a volume group structure recovery, and more specifically, for performing a volume group structure recovery in a virtualized server recovery environment.

BACKGROUND

In the virtualized server environments, such as cloud computing environments, a virtualized server recovery (VSR) replication agent may be enabled to copy bit by bit every change on a customer disk to a VSR replication server (RS) where every customer partition is represented by a same sized partition on the RS side. Since replication in VSR for Linux root volume groups is working on a partition level, a replication server, which should be able to handle multiple volume groups from cloned systems on a customer side, may need to have unique UUIDs (Universal Unique IDentifier) for every physical volume managed by a LVM (logical volume manager) and volume group on the VSR side. The above mentioned UUIDs may be changed during customers' server boarding (i.e., new customer/user/server gets on board of a cloud computing environment) to the VSR by an automated process driven by the external company. A problem may occur at the moment a user is changing something in the LVM configuration relating to the volume group, such as, e.g., by a logical volume addition/removal/resize. If the VSR agent is replicating the original LVM information to the replication server, the VSR agent causes changed UUIDs to be reverted to the original UUIDs. In such situations, an administrator team has to change those parameters manually by a complicated process of finding affected replication pairs and running a full data comparison between a source server and replicated volumes, which is called "differential compare".

However, if more than one server at the same time replicates the original LVM information, the replication server cannot determine which physical volume may belong to which volume group since the UUIDs are the same, which is causing conflicts for the operating system. and which may be fixed by taking action to stop the replication for one server, take the disks off related to the relevant server, replicate the second server again, change manually the UUIDs and re-attach the first server again using a UUID change procedure. When more servers replicate the original LVM information, such as in situations when a whole site (e.g., hundreds of servers) need to be re-replicated from the beginning, the volume group consistency restoration takes a lot of time due to the fact that every single server has to be fixed manually, one by one, while other servers are off-line, which leads to unacceptable off-line time, user complains, liability problems, and contractual complications in cloud computing environments.

SUMMARY

Embodiments of the present invention provide a method, and associated computer system and computer program product, for automatically performing a volume group structure recovery in a virtualized server recovery environment. One or more processors of the computer system access a first physical volume and read a first portion of the first physical volume and store the first portion in a temporary file. The one or more processors retrieve a last valid volume group backup for a volume group whose volume group structure is to be recovered. The volume group is a logical group of one or more physical volumes that include the first physical volume. The volume group backup includes respective volume group identifiers corresponding to the physical volumes of the volume group. The one or more processors generate a random volume group identifier. The one or more processors replace an existing volume group identifier stored in the temporary file with the generated random volume group identifier for identifying the volume group, wherein the existing volume group identifier is a volume group name of the volume group. The one or more processors access a list of the physical volumes of the logical group of one or more physical volumes. The one or more processors re-initialize all listed physical volumes in the list and respective physical volume identifiers that correspond to the listed physical volumes. The one or more processors generate a set of new volume group identifiers during the re-initializing of all listed physical volumes. The re-initializing replaces the volume group identifiers in the last valid volume group backup with the generated new volume group identifiers. The one or more processors restore the volume group's volume group structure using a backup structure stored in the temporary file.

BRIEF DESCRIPTION OF THE DRAWINGS

Embodiments of the invention will be described, by way of example only, and with reference to the following drawings.

DETAILED DESCRIPTION

Figure 1:
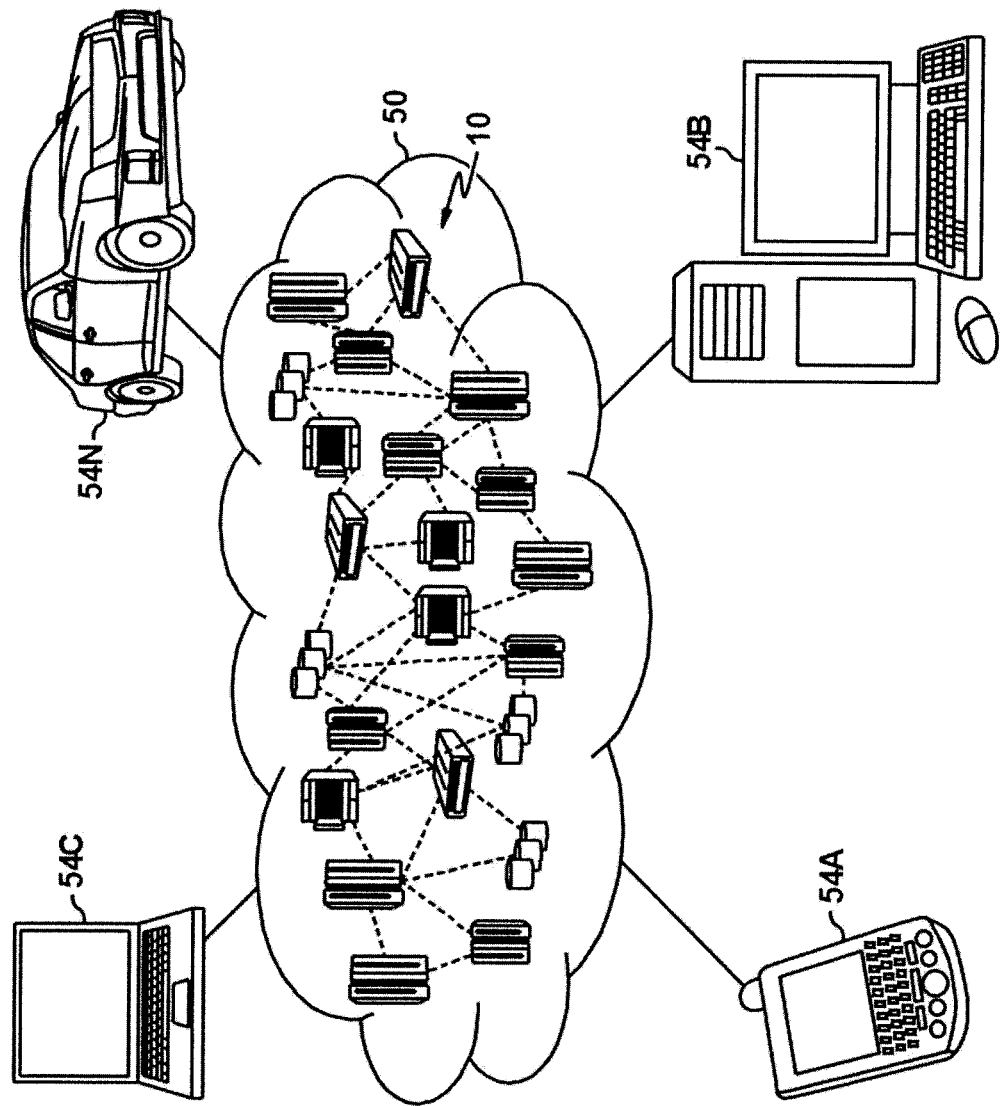
FIG. 1 depicts a cloud computing environment, according to an embodiment of the present invention.

In the context of this description, the following definitions, conventions, terms and/or expressions are presented.

The term 'volume group structure recovery' may denote a reconstruction or reconstitution of the structure of a volume group, which may not be intermixed with the recovery of the content of a logical volume group or individual physical volumes. In a Linux operating system environment, the recovery may be performed using the command "vgcfgrestore".

The term 'virtualized server recovery environment' may denote a computing environment deploying a sizable number of virtualized servers (e.g., virtual machines) which may be deployed in cloud computing environments. Operators of such cloud computing environments may guarantee a recovery of volume groups, in particular also the volume group structures.

The term 'physical volume' is defined as an individual physical device for storing data. In one embodiment, the device may be a physical magnetic storage disk. However, other storage media may also be possible, such as a solid state disk and another device designed to mimic a spinning disk.

The term 'logical volume group' (or "volume group") is defined as a logical group of one or more physical volumes.

The term 'first portion of a physical volume' is defined as first storable bytes of data stored on a physical volume; e.g., the first megabyte of data. Other data amounts may be possible as long as the data required to define the structure of the volume group may be stored in that first portion.

The term 'temporary file' may denote a data file which may be generated "on-the-fly" which may be required for only a limited time during a defined operation after which the data in the temporary file may no longer be required. Thus, the temporary file may be seen as an intermediate storage option.

The term 'last valid volume group backup' may denote a last version of a volume group structure backup which was written to a first portion of physical volume as a standard task during any LVM modification. This first portion of physical volume may contain more volume group backups, but all portions other than the newest portion of physical volume may not describe the latest structure of the volume group. Therefore, the recovery will destroy real data and may thus not be valid.

The term 'volume group identifier' may denote a marker or pointer, such as a sequence of characters denoting a specific volume group. The volume group identifier may comprise a plurality of characters.

The term 'list of all physical volumes' may denote, in the context of this application, identifiers available in a listed form of all physical volumes/devices being part of a volume group.

The term 're-initializing' (in particular a re-initialization of a physical volume) may denote a reset the LVM metadata of a physical disk or a partition thereof, which may also be denoted as flushing or deleting the entire content of LVM metadata in the related disk. A natural next step after the re-initialization may be restoring the structure of the LVM metadata using a prepared backup file. In a Linux operating system environment, the re-initialization may be performed using the command "pvcreate-ff". It may be noted that the content of the data of the physical volume may still be intact. Thus, a restructuring or re-initialization of the metadata of the physical disk may be instrumental in being able to access the content data again. Re-initialization of physical volumes may include re-initialization of the respective physical volume identifiers that correspond to the re-initialized physical volumes.

The term 'volume group structure' may denote the logical structure of a group of volumes, which is the logical data structure used by a Logical Volume Manager (LVM) in a Linux operating system environment. The LVM denotes a device mapper target that provides logical volume management for the Linux kernel. Most modern Linux distributions are LVM-aware to the point of being able to have the root file systems of the Linux distributions on a logical volume.

The term 'physical volume name' may denote a natural name tag for a physical volume/device. Using these physical volume names, physical volumes may be identified easily.

The term 'Linux' may denote the well-known UNIX-like computing system assembled under the model of free and open-source software development and distribution. The defining component of Linux is the Linux kernel, an operating system kernel first released in 1991 by Linus Torvalds.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

FIG. 1 depicts a cloud computing environment 50, according to an embodiment of the present invention. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
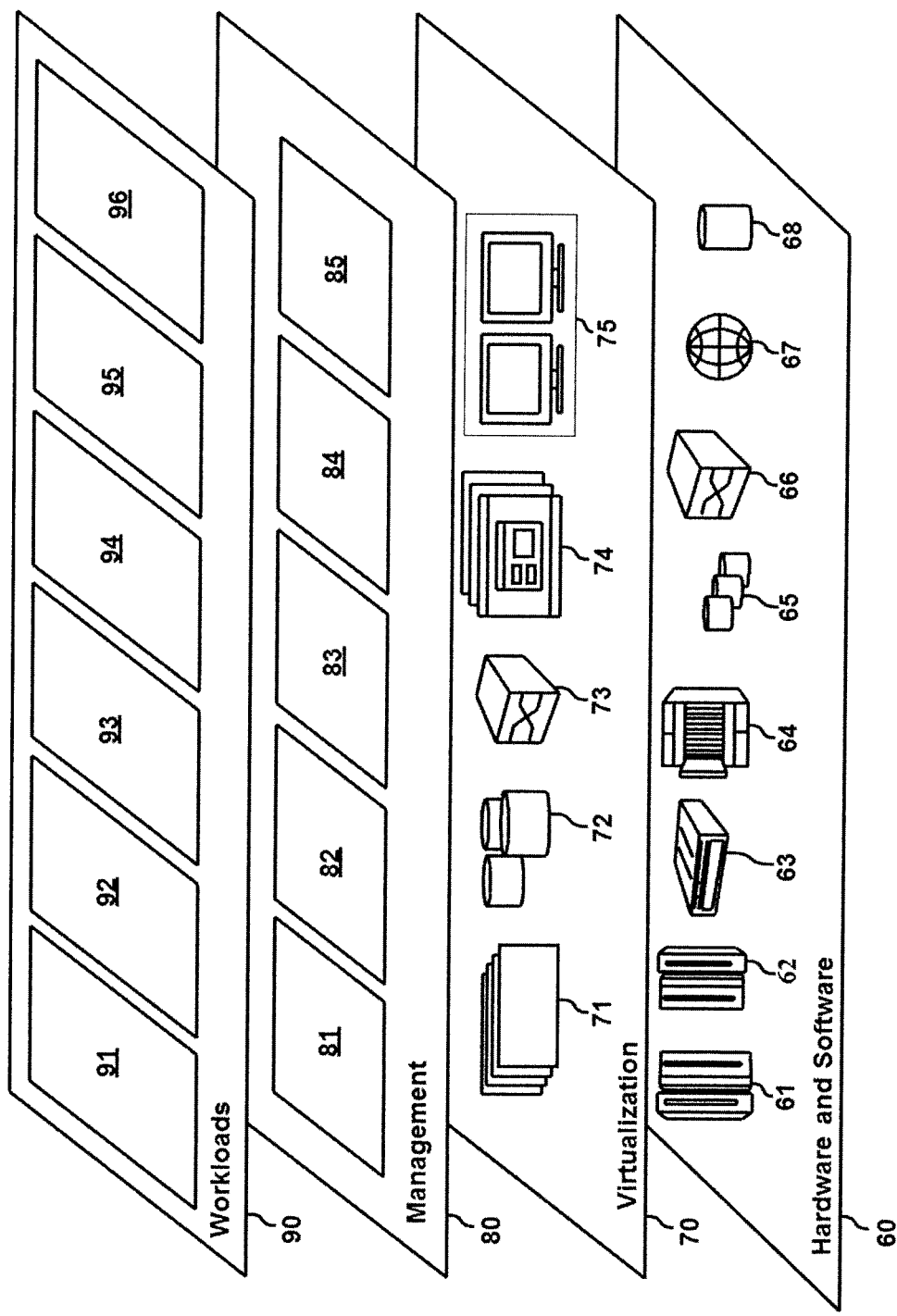
FIG. 2 depicts functional abstraction model layers provided by the cloud computing environment of FIG. 1, according to an embodiment of the present invention.

FIG. 2 depicts a set of functional abstraction layers provided by the cloud computing environment 50 of FIG. 1, according to an embodiment of the present invention. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and processing 96 by the system 300 of FIG. 5 for performing a volume group structure recovery in a virtualized server recovery environment.

It may be noted that cloud software may take full advantage of the cloud paradigm by being service-oriented with a focus on statelessness, low coupling, modularity, and semantic interoperability.

The computer-implemented method of the present invention for automatically performing a volume group structure recovery may offer multiple advantages and technical effects.

Logical volume groups may become inconsistent for several reasons. As of today, it may always be required to re-initiate logical volume groups using a series of manual steps, in particular comparing source volumes with target volumes and resending delta data and re-initiating the structure of a logical volume group because for a Linux type operating system root volume groups in VSR, data replication is performed on a partition level. The method and/or system, as well as a computer program product, of the present invention may overcome the time-consuming tasks to restore the volume group structure if a manual addition or removal or resizing of a component of the volume group happened which may be replicated, which may allow a much faster restructuring and recovery of damaged logical volume groups in case of a necessity to start a recovery process for customers.

A completely manual re-initialization of the structure of a large number of logical volume groups may be too time-consuming and may prove to be non-feasible in a disaster recovery as a service offering.

Thus, the present invention enables an operator of a large cloud computing environment in data restoring situations to guarantee the original structure of one or more logical volume groups if manual additions, or removals, or resizes have occurred in the past.

The present invention may increase user/customer satisfaction, increase availability times of resources, e.g., in cloud computing centers, and may also increase the usage of existing resources due to reduced downtimes.

According to one embodiment of the method, the accessing of the physical volume may also comprise receiving a physical volume name that may be received from a user input via an input device such as a keyboard or by selecting an option form a displayed list, which enables the user to define which group of data volumes may be recovered in the structure of the volume group.

According to one embodiment of the method, the volume group name may be retrieved from the temporary file storing the first portion. According to another embodiment of the method, the volume group name may be retrieved from the first portion of the physical volume, which may also be received from a user input via an input device such as a keyboard or by selecting an option from a displayed list. Generally, it does not matter from where the volume group name may be retrieved. However, it may be required to re-establish the volume group name in order to fully perform the method.

According to one embodiment of the method, the virtualized server recovery environment may comprise Linux as operating system. It has been found useful to focus with the implementation of the present invention on this Linux computing environment. Additionally, a set of prerequisites may be better fulfilled in the Linux operating system environment than in other operating system environments in order to perform the method.

According to one embodiment of the method, the first portion, and in particular the first portion of data, may comprise the first portion of data in readable ASCII format, which may be valid for the volume group name. The first portion may be the data stored in the first storage sector of the physical volume.

According to an embodiment of the method, the list of all physical volumes may be generated by a recovery function for virtualized servers. The recovery function may, in particular in a Linux type operating system environment, be performed by the VSR (virtualized server recovery) replication agent using a replication server.

According to an embodiment of the method, the volume group structure may be the structure of a volume group area of the volume group. Hence, the data area defining the whole structure of the volume group will be maintained and restored in the event of a manual destruction of the volume group information by a manual addition, removal or resizing of an LVM on a source volume for a replication pair.

An embodiment of the method may comprise also restoring the content of the volume group data from the last valid backup. Thus, not only the structure but also the complete data may be recoverable. A loss of data due to unskillful addition or removal or resizing of an element of a volume group in the Linux type operating system environment, in particular in highly virtualized cloud computing environments, may be prevented.

Figure 3:
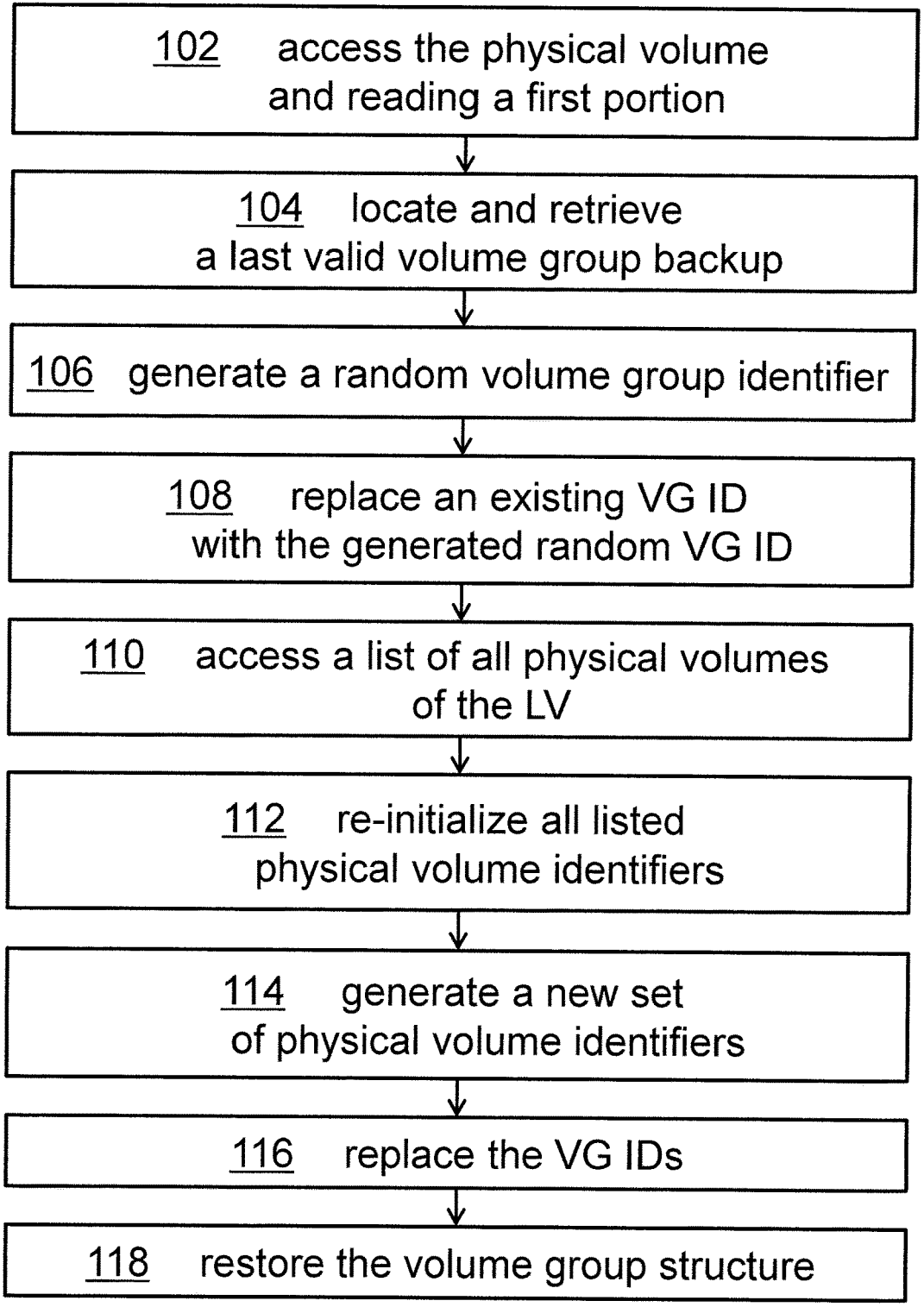
FIG. 3 shows a flow chart of a method for automatically performing a volume group structure recovery in a virtualized server recovery environment, in accordance with embodiments of the present invention.

FIG. 3 shows a flow chart of a method 100 for automatically performing a volume group structure recovery in a virtualized server recovery environment, in accordance with embodiments of the present invention. The method comprises accessing the physical volume and reading, in step 102, a first portion from the physical volume and storing the first portion in a temporary file. The first portion is typically, e.g., the first megabyte on the physical volume. Advantageously, all meta-data may be stored in the first megabyte of data in ASCII format, which makes the meta-data be read easily.

Then, the method comprises locating and retrieving, in step 104, a last valid volume group backup for the volume group whose structure has to be recovered. The related clear name in ASCII format will be found in the first megabyte of the physical volume. Next, the method comprises generating, in step 106, a random volume group identifier basically in the form of a UUID (universal unique identifier), which may be performed, in particular in the Linux operating system environment, using the command "/dev/urandom".

As a next step, the method comprises replacing, in step 108, an existing volume group identifier stored in the temporary file with the generated random volume group identifier, before accessing, in step 110, a list of all physical volumes being part of the volume group whose structure is to be recovered. This list of all physical volumes may be available from the VSR replication software. Then a re-initialization, in step 112, of all listed physical volume identifiers is performed. In step 112, the system gets rid of, or clears, or deletes all entries in the file header. The content itself may not be deleted. However, with the deletion of the header or structure information, the access to data may not be possible using standard access methods.

Figure 4:
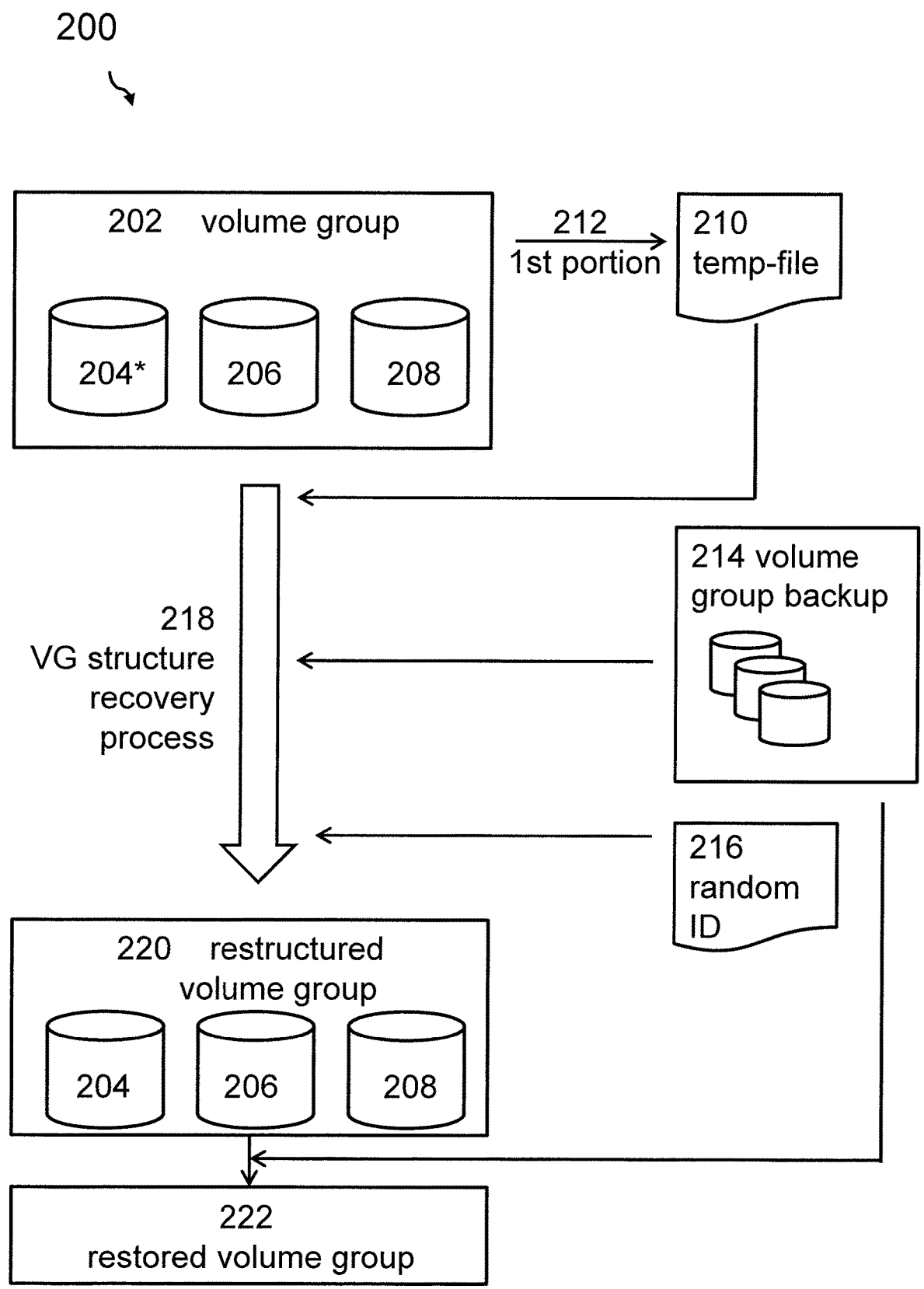
FIG. 4 shows a block diagram of elements used for automatically performing a volume group structure recovery in a virtualized server recovery environment, in accordance with embodiments of the present invention.

The present invention may also include the following three steps: generating, in step 114, a new set of physical volume identifiers during the re-initializing of all physical volumes being part of the volume group; replacing, in step 116, in the last valid volume group backup for the volume group the volume group identifiers with the newly generated volume group identifiers; and restoring, in step 118, the volume group structure for the volume group using a backup structure generated in the temporary file. FIG. 4 shows a block diagram 200 of elements used for automatically performing a volume group structure recovery in a virtualized server recovery environment, in accordance with embodiments of the present invention. The original volume group 202 comprises the volumes 204, 206 and 208. The asterisk at the volume 204 may indicate that a manual manipulation happened; e.g., in the form of an addition, a removal or a resizing of the volume 204. FIG. 4 shows also the temporary file 210 to which the first portion of the volume group is transferred, in process 212. This information (i.e., the first portion of the volume group), as well as the content of the volume group backup 214 as well as input from the random generator 216 in the form of random IDs, is used in the volume group structure recovery process 218, as explained above, resulting in restored volume group 222.

As a result of the process, a volume group 220 with the re-established volume group structure is generated. As an optional step, the content of the volume group may too be restored from the volume group backup 214, resulting in restored volume group 222.

Figure 5:
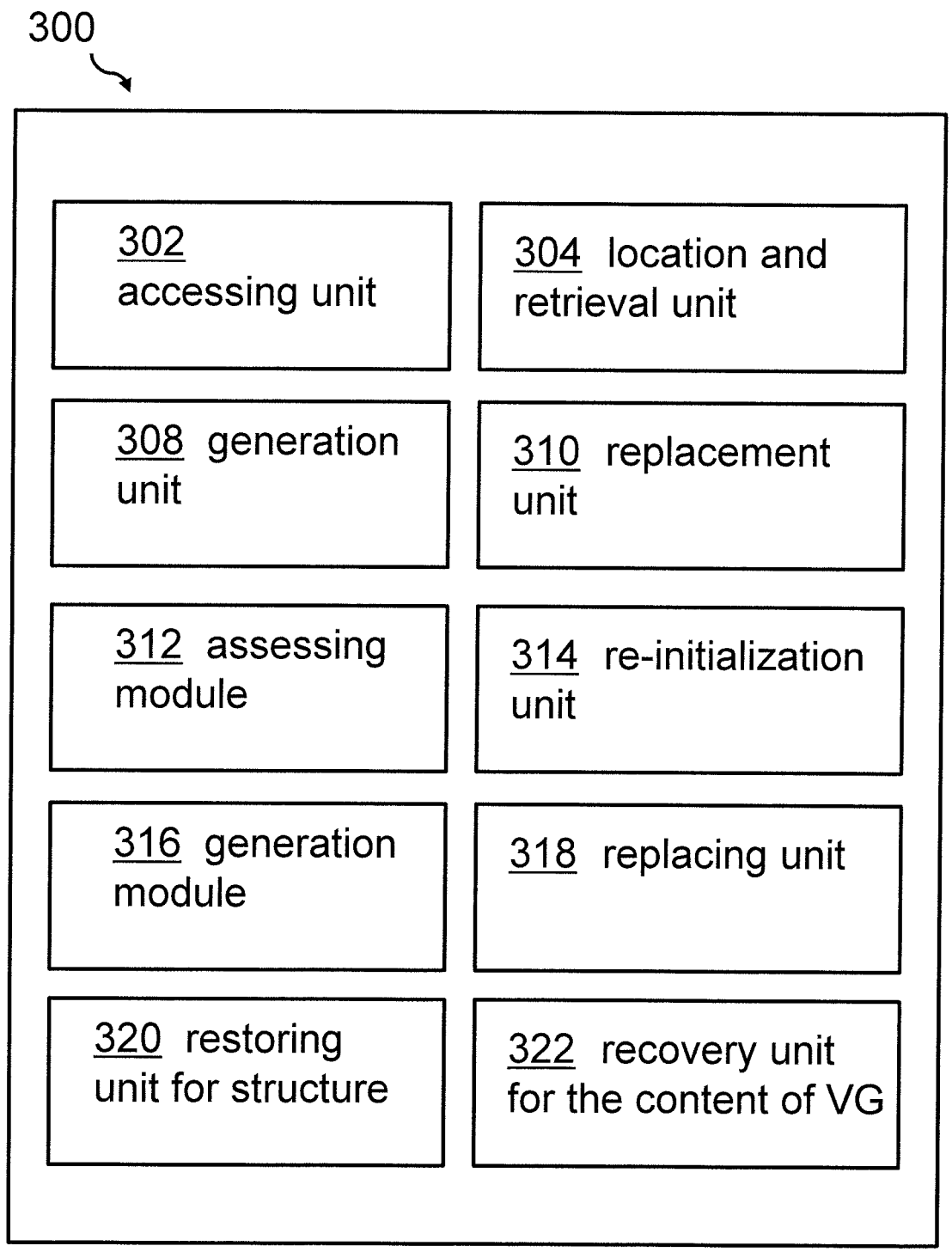
FIG. 5 shows a block diagram of an embodiment of the system used for performing a volume group structure recovery in a virtualized server recovery environment, in accordance with embodiments of the present invention.

FIG. 5 shows a block diagram of an embodiment of the system 300 used for performing a volume group structure recovery in a virtualized server recovery environment, in accordance with embodiments of the present invention. The system 300 comprises: an accessing unit 302 adapted for accessing the physical volume and adapted for reading a first portion from the physical volume and storing the first portion in a temporary file; a location and retrieval unit 304 adapted for locating and retrieving a last valid volume group backup for the volume group which structure is to be recovered; a generation unit 308 adapted for generating a random volume group identifier; a replacement unit 310 adapted for replacing an existing volume group identifier stored in the temporary file with the generated random volume group identifier; an accessing module 312 adapted for accessing a list of names of all physical volumes being part of the volume group which structure is to be recovered; a re-initialization unit 314 adapted for re-initializing all listed physical volume identifiers; a generation module 316 adapted for generating a new set of physical volume identifiers during the re-initialization of all physical volumes being part of the volume group; a replacing unit 318 adapted for replacing in the last valid volume group backup for the volume group the volume group identifiers with the newly generated volume group identifiers; and a restoring unit 320 adapted for restoring, for the volume group, the volume group's volume group structure using a backup structure generated in the temporary file. Optionally, the system may comprise a recovery unit 322 for the content of the volume group using the volume group backup.

Figure 6:
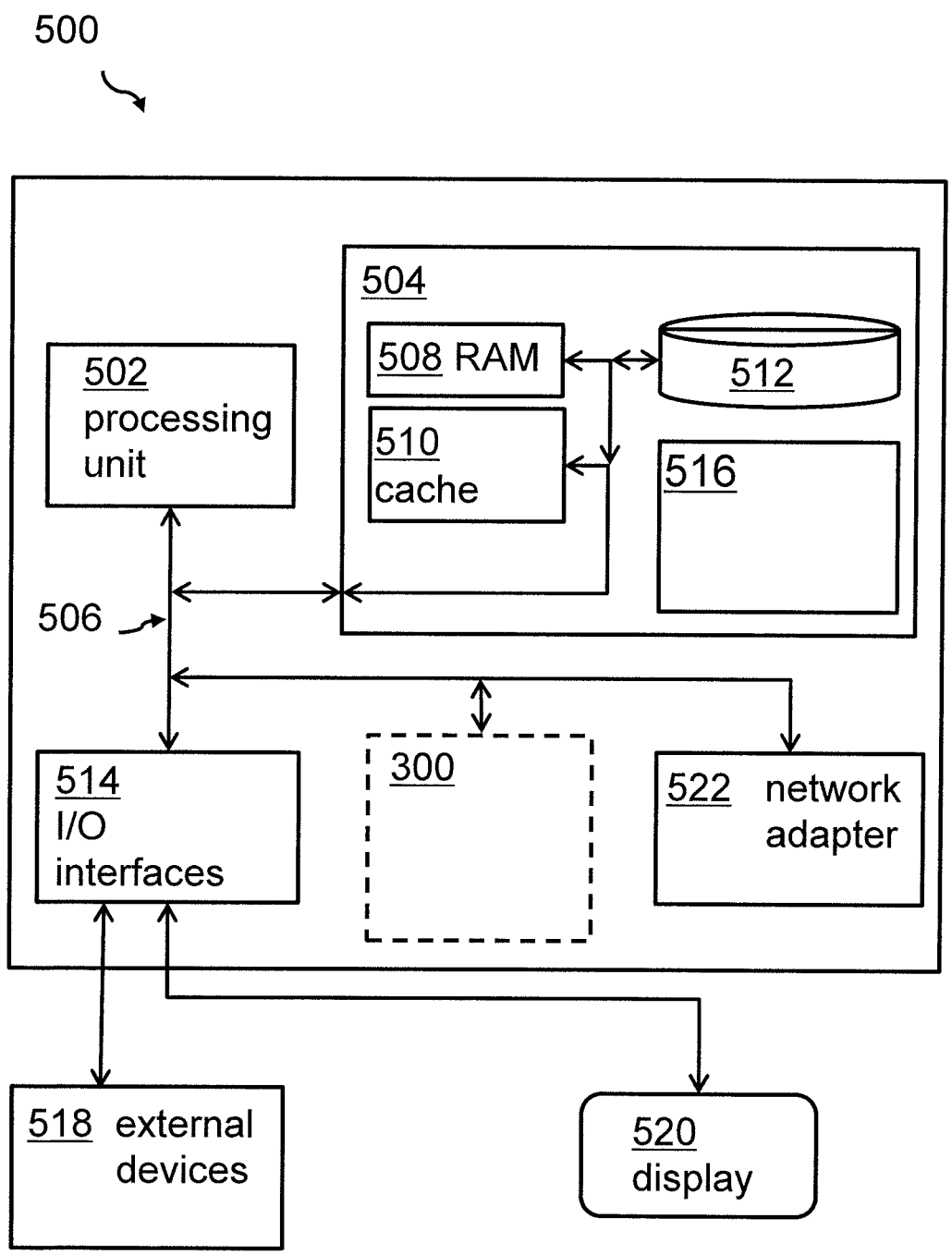
FIG. 6 shows an embodiment of a computer system for performing a volume group structure recovery in a virtualized server recovery environment, by executing program code in accordance with embodiments of the present invention.

Embodiments of the invention may be implemented together with virtually any type of computer regardless of the platform being suitable for storing and/or executing program code. FIG. 6 shows, as an example, a computer system 500 for performing a volume group structure recovery in a virtualized server recovery environment, by executing program code in accordance with embodiments of the present invention. It may also be noted that the described system for performing a volume group structure recovery in a virtualized server recovery environment, as well as elements of the cloud computing environment, may be implemented, at least partially, in form of the computing system 500.

The computing system 500 is only one example of a suitable computer system and is not intended to suggest any limitation as to the scope of use or functionality of embodiments of the invention described herein. Regardless, computer system 500 is capable of being implemented and/or performing any of the functionality set forth hereinabove. In the computer system 500, there are components, which are operational with numerous other general purpose or special purpose computing system environments or configurations. Examples of well-known computing systems, environments, and/or configurations that may be suitable for use with computer system/server 500 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like. Computer system/server 500 may be described in the general context of computer system-executable instructions, such as program modules, being executed by a computer system 500. Generally, program modules may include routines, programs, objects, components, logic, data structures, and so on that perform particular tasks or implement particular abstract data types. Computer system/server 500 may be practiced in distributed cloud computing environments where tasks are performed by remote processing devices that are linked through a communications network. In a distributed cloud computing environment, program modules may be located in both local and remote computer system storage media including memory storage devices.

As shown in the figure, computer system/server 500 is shown in the form of a general-purpose computing device. The components of computer system/server 500 may include, but are not limited to, one or more processors or processing units 502, a system memory 504, and a bus 506 that couples various system components including system memory 504 to the processor 502. Bus 506 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus. Computer system/server 500 typically includes a variety of computer system readable media. Such media may be any available media that is accessible by computer system/server 500, and it includes both, volatile and non-volatile media, removable and non-removable media.

The system memory 504 may include computer system readable media in the form of volatile memory, such as random access memory (RAM) 508 and/or cache memory 510. Computer system/server 500 may further include other removable/non-removable, volatile/non-volatile computer system storage media. By way of example only, storage system 512 may be provided for reading from and writing to a non-removable, non-volatile magnetic media (not shown and typically called a 'hard drive'). Although not shown, a magnetic disk drive for reading from and writing to a removable, non-volatile magnetic disk (e.g., a 'floppy disk'), and an optical disk drive for reading from or writing to a removable, non-volatile optical disk such as a CD-ROM, DVD-ROM or other optical media may be provided. In such instances, each can be connected to bus 506 by one or more data media interfaces. As will be further depicted and described below, memory 504 may include at least one program product having a set (e.g., at least one) of program modules that are configured to carry out the functions of embodiments of the invention.

The program/utility, having a set (at least one) of program modules 516, may be stored in memory 504 by way of example, and not limitation, as well as an operating system, one or more application programs, other program modules, and program data. Each of the operating system, one or more application programs, other program modules, and program data or some combination thereof, may include an implementation of a networking environment. Program modules 516 generally carry out the functions and/or methodologies of embodiments of the invention as described herein.

The computer system/server 500 may also communicate with one or more external devices 518 such as a keyboard, a pointing device, a display 520, etc.; one or more devices that enable a user to interact with computer system/server 500; and/or any devices (e.g., network card, modem, etc.) that enable computer system/server 500 to communicate with one or more other computing devices. Such communication can occur via Input/Output (I/O) interfaces 514. Still yet, computer system/server 500 may communicate with one or more networks such as a local area network (LAN), a general wide area network (WAN), and/or a public network (e.g., the Internet) via network adapter 522. As depicted, network adapter 522 may communicate with the other components of computer system/server 500 via bus 506. It should be understood that although not shown, other hardware and/or software components could be used in conjunction with computer system/server 500. Examples, include, but are not limited to: microcode, device drivers, redundant processing units, external disk drive arrays, RAID systems, tape drives, and data archival storage systems, etc.

Additionally, the system 300 for performing a volume group structure recovery in a virtualized server recovery environment may be attached to the bus system 506.

The descriptions of the various embodiments of the present invention have been presented for purposes of illustration, but are not intended to be exhaustive or limited to the embodiments disclosed. Many modifications and variations will be apparent to those of ordinary skills in the art without departing from the scope and spirit of the described embodiments. The terminology used herein was chosen to best explain the principles of the embodiments, the practical application or technical improvement over technologies found in the marketplace, or to enable others of ordinary skills in the art to understand the embodiments disclosed herein.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A computer program product of the present invention comprises one or more computer readable hardware storage devices having computer readable program code stored therein, said program code executable by one or more processors of a computer system to implement the methods of the present invention.

A computer system of the present invention comprises one or more processors, one or more memories, and one or more computer readable hardware storage devices, said one or more hardware storage device containing program code executable by the one or more processors via the one or more memories to implement the methods of the present invention.

In one embodiment, the computer or computer system may be or include a special-purpose computer or machine that comprises specialized, non-generic hardware and circuitry (i.e., specialized discrete non-generic analog, digital, and logic based circuitry) for (independently or in combination) particularized for executing only methods of the present invention. The specialized discrete non-generic analog, digital, and logic based circuitry may include proprietary specially designed components (e.g., a specialized integrated circuit, such as for example an Application Specific Integrated Circuit (ASIC), designed for only implementing methods of the present invention).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others or ordinary skill in the art to understand the embodiments disclosed herein.

What is claimed is:

1. A method for automatically performing a volume group structure recovery in a virtualized server recovery environment, said method comprising:
    automatically accessing, by one or more processors of a computer system, a first physical volume and reading, by the one or more processors, a first portion of the first physical volume and storing, by the one or more processors, the first portion in a temporary file;
    automatically locating and retrieving, by the one or more processors, a last valid volume group backup for a volume group whose volume group structure is to be recovered, said volume group being a logical group of one or more physical volumes that include the first physical volume, said volume group backup including respective volume group identifiers corresponding to the physical volumes of the volume group;
    automatically generating, by the one or more processors, a random volume group identifier;
    automatically replacing, by the one or more processors, an existing volume group identifier stored in the temporary file with the generated random volume group identifier for identifying the volume group, wherein the existing volume group identifier is a volume group name of the volume group;
    automatically accessing, by the one or more processors, a list of the physical volumes of the logical group of one or more physical volumes;
    automatically re-initializing, by the one or more processors, all listed physical volumes in the list and respective physical volume identifiers that correspond to the listed physical volumes and deleting all entries from a file header of the temporary file, wherein content in the temporary file outside the file header is not deleted;
    automatically generating, by the one or more processors, a set of new volume group identifiers during said re-initializing all listed physical volumes;
    automatically replacing, by the one or more processors, the volume group identifiers in the last valid volume group backup with the generated new volume group identifiers; and
    automatically restoring, by the one or more processors, the volume group's volume group structure using a backup structure stored in the temporary file.

2. The method of claim 1, wherein said accessing the first physical volume comprises:
    receiving a physical volume name of the first physical volume.

3. The method of claim 1, said method further comprising:
    retrieving, by the one or more processors, the volume group name from the temporary file storing the first portion.

4. The method of claim 1, said method further comprising:
    retrieving, by the one or more processors, the volume group name from the first portion of the first physical volume.

5. The method of claim 1, wherein the virtualized server recovery environment comprises Linux as operating system.

6. The method of claim 1, wherein the first portion comprises data in readable ASCII format.

7. The method of claim 1, wherein the list is generated by a recovery function for virtualized servers.

8. The method of claim 1, wherein the volume group structure is a structure of a volume group area of the volume group.

9. The method of claim 1, said method further comprising:
    restoring, by the one or more processors, content of volume group data from the last valid volume group backup.

10. A computer program product, comprising one or more computer readable hardware storage devices having computer readable program code stored therein, said program code containing instructions executable by one or more processors of a computer system to implement a method for automatically performing a volume group structure recovery in a virtualized server recovery environment, said method comprising:

automatically accessing, by the one or more processors, a first physical volume and reading, by the one or more processors, a first portion of the first physical volume and storing, by the one or more processors, the first portion in a temporary file;

automatically locating and retrieving, by the one or more processors, a last valid volume group backup for a volume group whose volume group structure is to be recovered, said volume group being a logical group of one or more physical volumes that include the first physical volume, said volume group backup including respective volume group identifiers corresponding to the physical volumes of the volume group;

automatically generating, by the one or more processors, a random volume group identifier;

automatically replacing, by the one or more processors, an existing volume group identifier stored in the temporary file with the generated random volume group identifier for identifying the volume group, wherein the existing volume group identifier is a volume group name of the volume group;

automatically accessing, by the one or more processors, a list of the physical volumes of the logical group of one or more physical volumes;

automatically re-initializing, by the one or more processors, all listed physical volumes in the list and respective physical volume identifiers that correspond to the listed physical volumes and deleting all entries from a file header of the temporary file, wherein content in the temporary file outside the file header is not deleted;

automatically generating, by the one or more processors, a set of new volume group identifiers during said re-initializing all listed physical volumes;

automatically replacing, by the one or more processors, the volume group identifiers in the last valid volume group backup with the generated new volume group identifiers; and automatically restoring, by the one or more processors, the volume group's volume group structure using a backup structure stored in the temporary file.

11. The computer program product of claim 10, wherein said accessing the first physical volume comprises:

receiving a physical volume name of the first physical volume.

12. The computer program product of claim 10, said method further comprising:

retrieving, by the one or more processors, the volume group name from the temporary file storing the first portion.

13. The computer program product of claim 10, said method further comprising:

retrieving, by the one or more processors, the volume group name from the first portion of the first physical volume.

14. The computer program product of claim 10, wherein the virtualized server recovery environment comprises Linux as operating system.

15. The computer program product of claim 10, wherein the first portion comprises data in readable ASCII format.

16. A computer system, comprising one or more processors, one or more memories, and one or more computer readable hardware storage devices, said one or more hardware storage device containing program code executable by the one or more processors via the one or more memories to implement a method for automatically performing a volume group structure recovery in a virtualized server recovery environment, said method comprising:

automatically accessing, by the one or more processors, a first physical volume and reading, by the one or more processors, a first portion of the first physical volume and storing, by the one or more processors, the first portion in a temporary file;

automatically locating and retrieving, by the one or more processors, a last valid volume group backup for a volume group whose volume group structure is to be recovered, said volume group being a logical group of one or more physical volumes that include the first physical volume, said volume group backup including respective volume group identifiers corresponding to the physical volumes of the volume group;

automatically generating, by the one or more processors, a random volume group identifier;

automatically replacing, by the one or more processors, an existing volume group identifier stored in the temporary file with the generated random volume group identifier for identifying the volume group, wherein the existing volume group identifier is a volume group name of the volume group;

automatically accessing, by the one or more processors, a list of the physical volumes of the logical group of one or more physical volumes;

automatically re-initializing, by the one or more processors, all listed physical volumes in the list and respective physical volume identifiers that correspond to the listed physical volumes and deleting all entries from a file header of the temporary file, wherein content in the temporary file outside the file header is not deleted;

automatically generating, by the one or more processors, a set of new volume group identifiers during said re-initializing all listed physical volumes;

automatically replacing, by the one or more processors, the volume group identifiers in the last valid volume group backup with the generated new volume group identifiers; and automatically restoring, by the one or more processors, the volume group's volume group structure using a backup structure stored in the temporary file.

17. The computer system of claim 16, wherein said accessing the first physical volume comprises:

receiving a physical volume name of the first physical volume.

18. The computer system of claim 16, said method further comprising:

retrieving, by the one or more processors, the volume group name from the temporary file storing the first portion.

19. The computer system of claim 16, said method further comprising:

retrieving, by the one or more processors, the volume group name from the first portion of the first physical volume.

20. The computer system of claim 16, wherein the virtualized server recovery environment comprises Linux as operating system.

\* \* \* \* \*